Feb. 20, 1923.
1,445,866.
O. ANDERSON.
STEERING WHEEL LOCK.
FILED APR. 3, 1922.
4 SHEETS—SHEET 1.
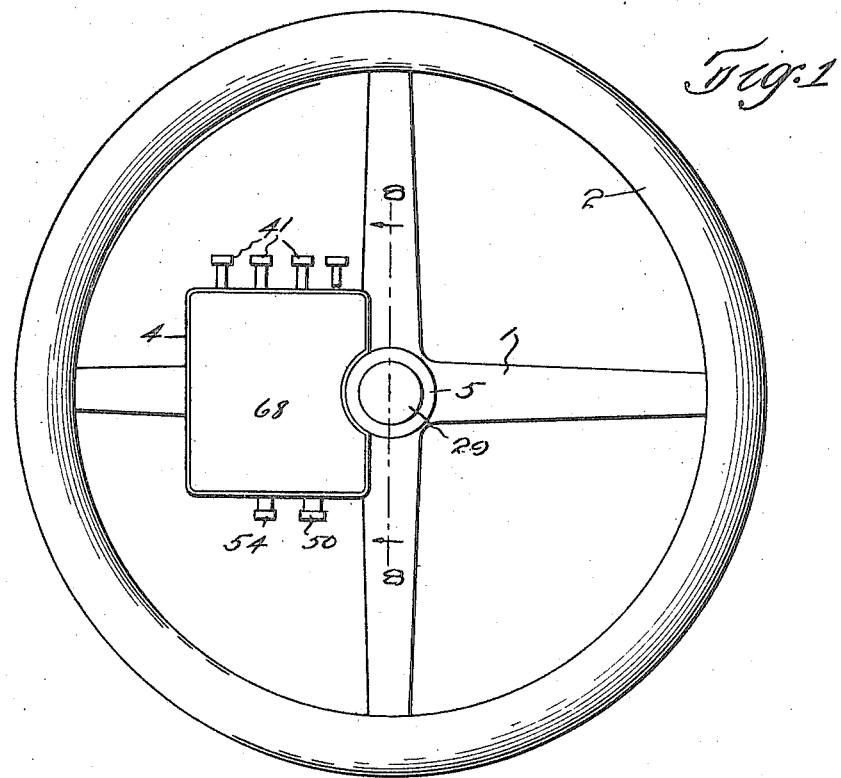
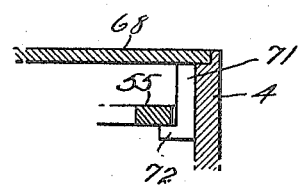
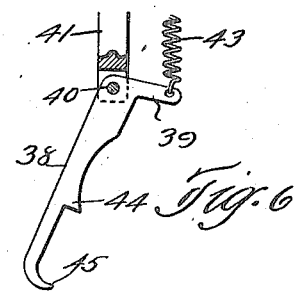
Inventor
Otto Anderson
By John A. Bomhart
Atty.

Feb. 20, 1923.
O. ANDERSON.
STEERING WHEEL LOCK.
FILED APR. 3, 1922.
1,445,866.
4 SHEETS—SHEET 2.
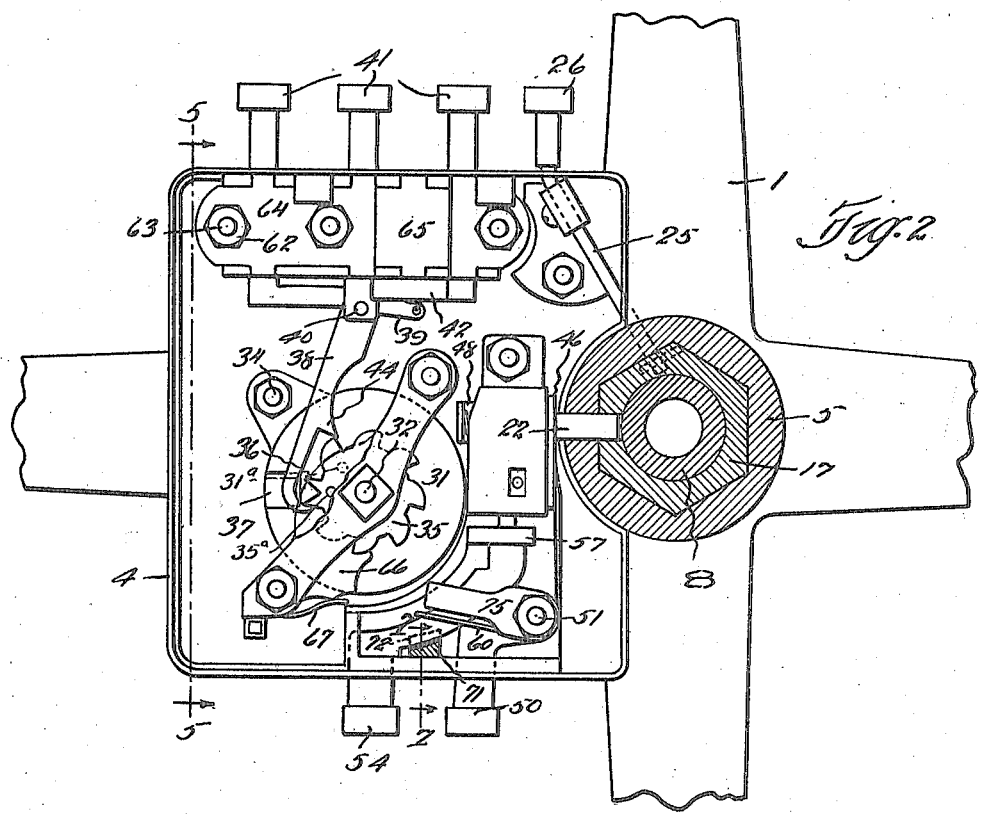
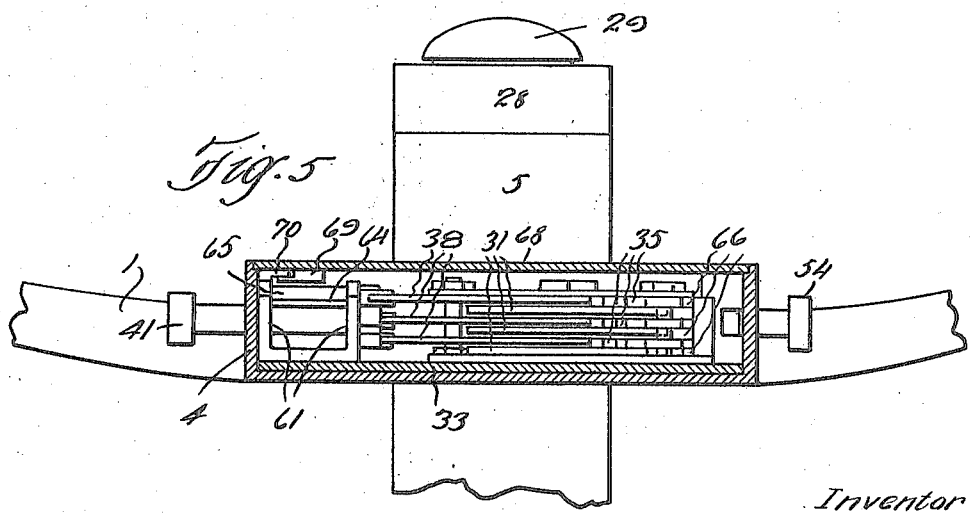
Inventor
Otto Anderson
By John A. Bommhardt
Atty.

Feb. 20, 1923.
1,445,866.

O. ANDERSON.
STEERING WHEEL LOCK.
FILED APR. 3, 1922.

4 SHEETS—SHEET 3.

Inventor
Otto Anderson
By John A. Bornhardt
Atty.

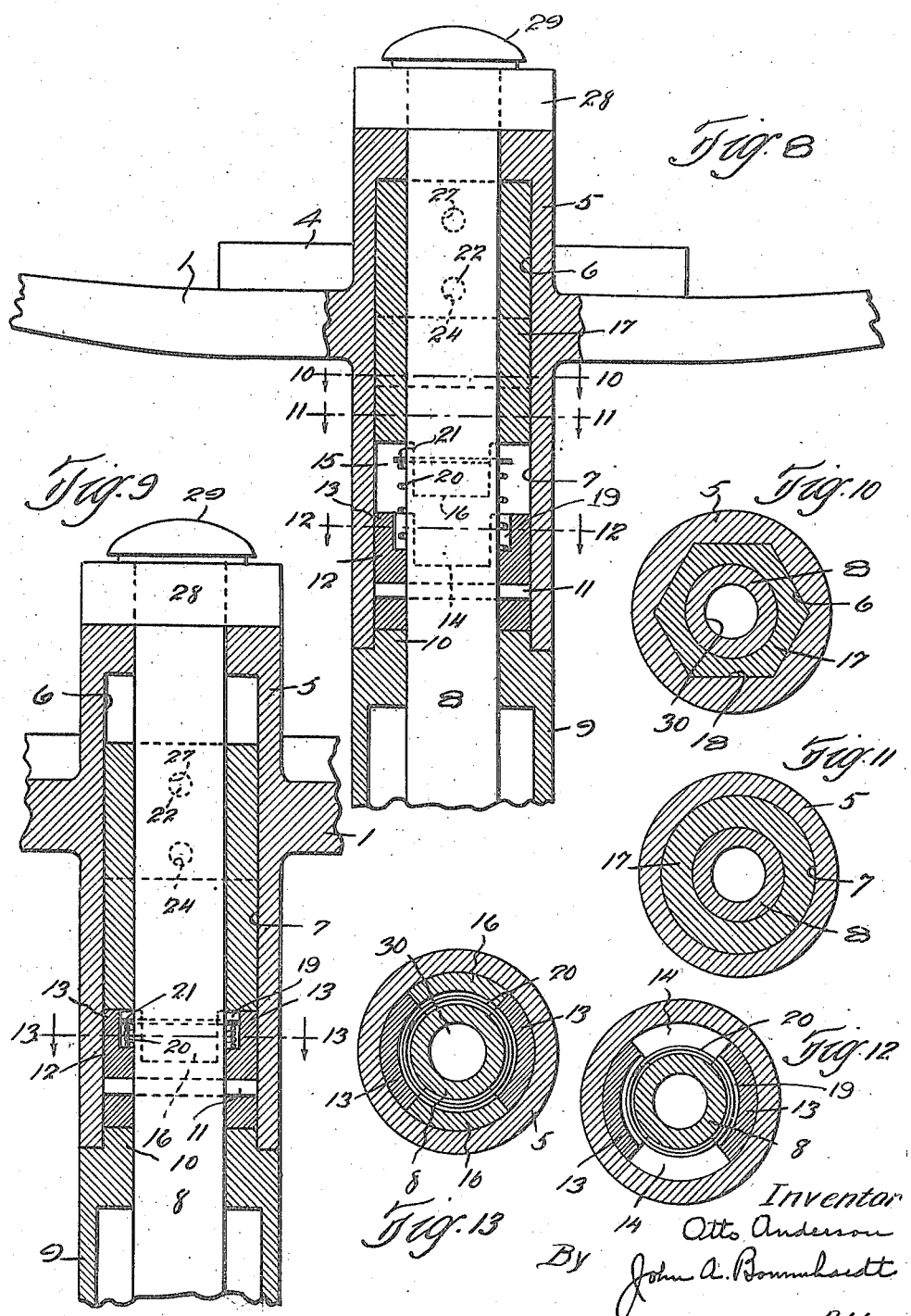

Patented Feb. 20, 1923.

1,445,866

UNITED STATES PATENT OFFICE.

OTTO ANDERSON, OF CLEVELAND, OHIO.

STEERING-WHEEL LOCK.

Application filed April 3, 1922. Serial No. 549,065.

*To all whom it may concern:*

Be it known that I, OTTO ANDERSON, a citizen of the Government of Sweden, residing at Cleveland, in the county of Cuyahoga and State of Ohio, have invented certain new and useful Improvements in Steering-Wheel Locks, of which the following is a specification.

This invention relates to steering wheel locks and to the manner of attaching the wheel to the steering post.

It is of that type in which when the device is locked in inoperative position the wheel will rotate freely upon the steering post and when moved into operative position will be locked to the steering post. The lock itself is of the combination type and has a plunger or bolt which controls the connecting means between the steering wheel and the steering post in either the operative or the inoperative position as desired.

Figure 3:
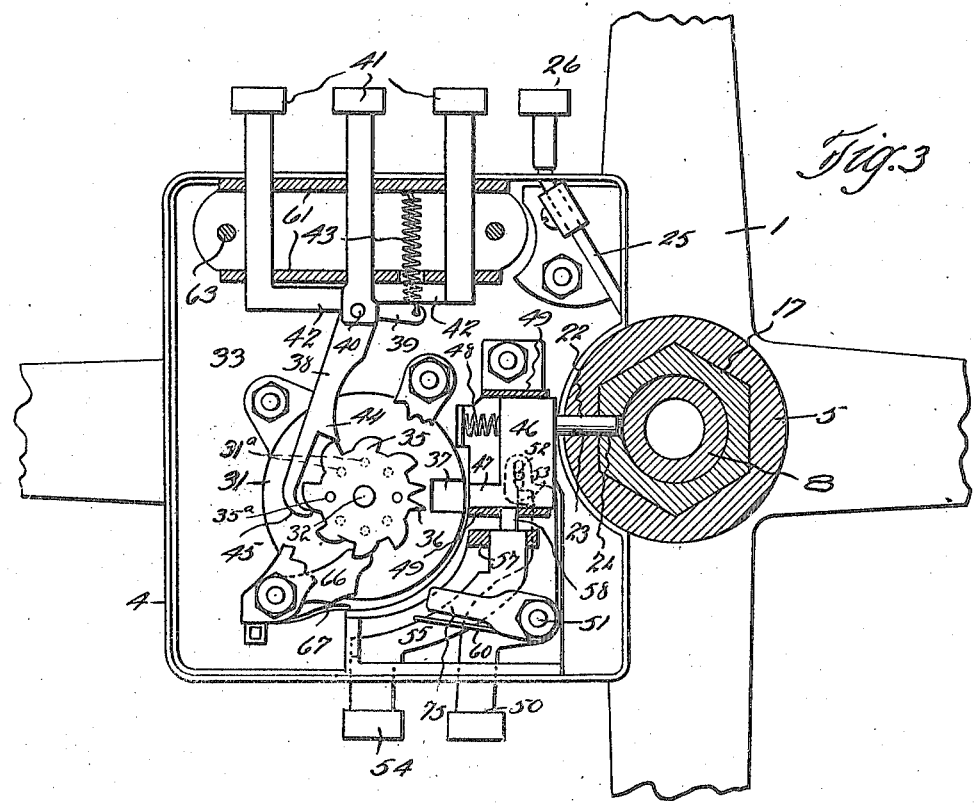
Figure 4:
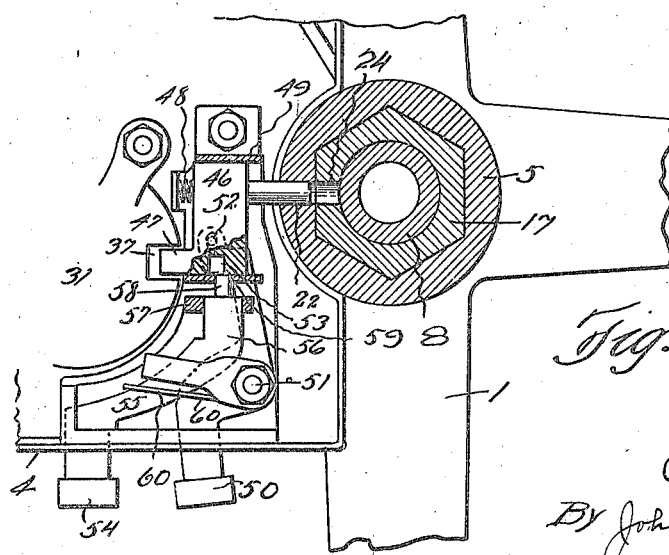

In the drawings Fig. 1 is a plan view of a steering wheel equipped with my device; Fig. 2 is a plan view of the lock, the cover being removed showing the parts in one position, part of the steering wheel column being in section; Fig. 3 is a view similar to Fig. 2 showing the parts in a different position and also partially broken away to show more clearly the design of some of the parts; Fig. 4 is a fragmentary plan view of the lock, the cover being removed with the parts in a still different position; Fig. 5 is a section on the line 5—5 of Fig. 2; Fig. 6 is a detail of one of the operating dogs; Fig. 7 is a fragmentary section on the line 7—7 of Fig. 2, showing the manner of locking the cover; Fig. 8 is a section on the line 8—8 of Fig. 1 showing the parts in inoperative position; Fig. 9 is a view similar to Fig. 8 showing the parts in an operative position; Figs. 10, 11 and 12 are sections on the lines 10—10, 11—11, 12—12, respectively of Fig. 8 and Fig. 13 is a section on the line 13—13 of Fig. 9.

Referring to the drawings by reference numerals, 1 indicates a spider having a wheel 2 attached thereon and a box 4 cast integral with the spider, said box containing the lock mechanism and 5 indicates a hub which is also cast integral with the spider 1. The hub 5 is hollow, the interior of the upper end being hexagonal as at 6, and the interior at the lower end being circular as at 7. 8 indicates the steering shaft, and the mechanism for connecting the hub 5 and consequently the steering wheel to the steering shaft is mounted around the steering shaft 8 and within the hub 5. 9 is the column or casing for the steering shaft and has its upper end reduced as indicated at 10 within the lower end of the hub 5.

Attached to the steering shaft 8 by a pin 11 directly above the casing 9 is a circular member 12 which has alternate tongues or projections 13 and cut-out parts 14 which are adapted to interlock or clutch with cut-out parts 15 and tongues 16 of a movable sleeve member 17.

The upper end of the movable member 17 is hexagonal in external shape as indicated at 18 and is adapted to fit within the hexagonal part 6 of the hub 5, and the lower end of the part 17 is circular and fits within the circular part 7 of the hub 5. The tongues 13 and 16 are recessed as indicated at 19 and a spring 20 is mounted therein, the upper end of said spring bearing against a ring 21, the spring normally tending to hold the member 17 in the raised position shown in Fig. 8.

The member 17 is locked in the position shown at Fig. 8 by a pin 22, which is operated by the lock mechanism, working through a hole 23 in the hub 5 into a hole 24 in the member 17.

In order to lock the wheel to the steering shaft the lock mechanism is operated to withdraw the pin 22 from the hole 24 and then the member 17 is forced downwardly by a lever 25 operated by a knob 26 until the tongues 13 and 16 interlock and then the pin 22 is advanced by the lock mechanism into a hole 27, whereby the wheel is locked to the shaft and the latter will turn with the wheel, as shown in Fig. 9 when the pin 22 is again retracted the spring 21 will force the member 17 upwardly, which will cause the clutch prongs 13 and 16 to disengage and consequently allow the wheel to rotate freely upon the shaft 8.

28 is a collar which is pinned to the upper end of the shaft 8 above the hub 5 which will prevent the wheel being removed from the steering shaft 8, and 29 indicates the horn button, the wires coming up through the hole 30 within the steering shaft.

The locking mechanism for operating the pin 22 will now be described. A plurality of disks 31 (3 being shown in the drawings) are rotatably mounted upon a shaft 32 carried by a base plate 33 which is inserted in the bottom of the lock housing 4 and retained there in any suitable manner such as by nuts and bolts 34. Mounted upon each of the wheels 31 and connected thereto is a ratchet member 36 which has all the teeth thereon alike except the tooth indicated at 36, the purpose of which will be hereinafter explained. Each of said disks 31 has a cut-out part 37 therein.

The disks 31 are rotated by dogs 38, said dogs having a bell crank portion 39 thereto and being pivoted as at 40 to plungers 41 or to right angles extensions 42 of the two outside plungers 41.

A spring 43 is connected to each of the arms 39 and serves a two-fold purpose; namely, first it holds the dog 38 in engagement with the ratchets 35 and it also returns the plungers 41 to their normal position, it being understood that in order to operate one of the ratchets 35, a plunger 41 is pushed in.

The dogs 38 have projections 44 which engage the teeth of the ratchet 35 and the ends of said dogs are turned as indicated at 45 and slide over the teeth of the ratchets 35 when the dog is being returned to its normal position by the spring 43.

The pin 22 is mounted on a block 46, said block having a projection 47 on the opposite side from the pin 22 and at the opposite end of the block 46. The block 46 is normally held in the position shown in Fig. 3; that is, the locked position, by a spring 48, and said block is adapted to be moved back and forth within guideways 49 by a lever 50 which is pivoted to a post 51 and attached to the underside of the block 46 by a pin 52.

The block 46 has a hole 53 in one end thereof for a purpose to be hereinafter described.

Another plunger 54 is mounted beside the lever 50 and extends into the housing 4 and is bent as indicated at 55 and then extends straight again as at 56, the part 56 working within a guide 57, and said part 56 has a pin 58 thereon which fits in a hole 59 in one of the guides 49.

The plunger 54 is normally held in the retracted position shown by a spring 60 which is coiled about the post 51.

The plungers 41 and springs 43 are mounted in guides 61 which are attached to the base plate 33 by nuts and bolts 62 and 63, there being a cover 64 thereon. Springs 43 are attached to the rear guide 62 and beneath the part 65 of the top 64.

Dogs 66 operated by springs 67 engage the teeth of the ratchets 35 and prevent back slip.

A cover 68 is placed over the lock mechanism and held there by two catches 69 which engage under lugs 70 on one side of the casing projecting upwardly from one of the guides 61 and the other end is held by a downwardly projecting member 71 which is hooked as at 72 and engages under the curved part 55 of the plunger 54.

A spring 75 is mounted on the post 51 and will force the cover 68 upwardly if and when the hook 72 is released by the plunger 54.

The device is operated as follows:

The disks 31 are respectively rotated by the plungers 41 and dogs 38 until the notches 37 are all brought in alignment with each other directly opposite the extension 47 in the block 46 as is clearly shown in Fig. 3. This is done in the following manner. When the plungers 41 are pushed in, the dog 38 will be caused to move the ratchet 35 the distance of one tooth, the teeth being all equally spaced, and on the return stroke of the dog 38 caused by the spring 43, the hooked end 45 will ride over the teeth on the ratchet and cause a clicking sound. When the dog 66 rides over the double tooth 36 it will give a double click which can be heard by the operator. He will then know that he will have to move that particular disk 31 a certain number of teeth past the point where he hears the double clicking to bring the notch 37 to the proper position. The ratchets 35 may be set to any desired position on the disks 31 and the operator must know just how many times he has to press the several plungers 41 in order to bring the respective disks 31 to the correct position for unlocking.

The ratchets 35 are attached to the disks 31 by pins 35ª on the ratchets, entering holes 31ª in the disks 31, so that they can be changed from one position to another and in this manner the combination of the lock can be changed.

When notches 37 are all brought into alignment opposite the lug 47 on the block 46, the lever 50 is operated, which will cause the block 46 to slide backward bringing the extension 47 within the notches 37 and withdrawing the pin 22 from either the hole 24 or 27 in the member 17 as the case may be. Then the member 17 can be operated by the lever 25 and handle 26 thereon to bring it into engagement with the member 12 if it is out of engagement. As was stated heretofore if the member 17 is in engagement with the member 12 the spring 21 will disengage the two members when the pin 22 is withdrawn from the hole 27. When the lever 50 is released the spring 48 will cause the block 46 to move in the opposite direction and consequently cause the pin 22 to enter either the hole 24 or 27 as the case may be. Then any one or all of the plungers 41 may be operated which will cause the cut-out parts 37 in the disks 31 to be moved and reset the lock and consequently prevent any movement of the block 46 and consequently the pin 22. In order to remove the cover 68 the notches 37 are brought into the position for unlocking as shown in Fig. 3 and the pressure is applied to the plunger 54 and at the same time the lever 50 is operated slowly until the block 46 has moved such a distance that the hole 53 will be brought opposite the pin 58 on the end of plunger 54 which will allow the plunger 54 to then be moved inwardly such a distance that the part 55 thereof will be moved from over the hook part 72 of the catch 71 and the spring 75 will cause one end of the cover to be raised slightly so that it can be grasped readily and the spring 60 will return the plunger 54 to its normal position.

From the above description it will be seen that I provide a shifting clutch or connection between the steering wheel and its shaft, this connection including a clutch member which slides up and down on the shaft, within the hub of the wheel. When the clutch member is slid up the clutch is disengaged and the wheel will turn freely on the shaft, so that the automobile cannot be steered, but when the clutch member is pushed down it will engage the fixed member carried by the steering shaft, and since the slidable clutch member is nonrotatably mounted in the hub of the wheel, the shaft will accordingly be turned by the wheel. As described, the shifting clutch member is locked in either of its positions by the combination lock device described, and it may be noted that the lock bolt does not take the strain of the steering, but merely acts to hold the movable clutch member in the position to which it is shifted.

The lock itself is a combination lock which depends for its operation on a double click or audible sound which must be heard by the operator and which gives him the clue for setting the tumblers or controlling disks in such position that the bolt can be retracted It is therefore practically impossible to pick the lock. The lock also includes a removable cover which is held in place by devices controlled by the tumblers.

I claim:

1. The combination of a steering shaft, a wheel thereon having a hub enclosing the upper end of the shaft, a fixed clutch member on the shaft within the hub, a sliding clutch member on the shaft and nonrotatably mounted in the hub, a spring between the fixed and movable clutch members tending to disengage the latter, a lever working through the hub and adapted to shift the movable clutch member into engagement against the tension of the spring, and means to lock the clutch member in either engaged or disengaged position, said means including a lock bolt movable through the hub to engagement with the movable clutch member.

2. The combination of a steering shaft and column, a steering wheel having a hollow hub enclosing and spaced from the upper end of the shaft and resting on the column, a clutch member fixed to the shaft within said space, a clutch member slidable in said space lengthwise of the shaft, into and out of engagement with the fixed clutch member, said slidable clutch member being rotatable with respect to the shaft and nonrotatable with respect to the hub, a spring tending to separate the clutch members, a lever working through the hub and engaging the slidable clutch member to shift the same into engagement with the fixed clutch member, and a lock carried on the hub and having a bolt working through the hub to engagement with the slidable clutch member, to hold the same in either position.

In testimony whereof, I affix my signature in presence of two witnesses.

OTTO ANDERSON.

Witnesses:
JOHN A. BOMMHARDT,
BESSIE F. POLLAK.